United States Patent
Murai et al.

(10) Patent No.: US 11,278,842 B2
(45) Date of Patent: Mar. 22, 2022

(54) ACID GAS ABSORBENT, ACID GAS REMOVAL METHOD, AND ACID GAS REMOVAL DEVICE

(71) Applicants: KABUSHIKI KAISHA TOSHIBA, Minato-ku (JP); TOSHIBA ENERGY SYSTEMS & SOLUTIONS CORPORATION, Kawasaki (JP)

(72) Inventors: Shinji Murai, Sagamihara (JP); Yukishige Maezawa, Hachioji (JP); Tetsuya Kaseda, Kawasaki (JP); Takehiko Muramatsu, Yokohama (JP); Satoshi Saito, Yamato (JP); Mitsuru Udatsu, Kawasaki (JP); Daigo Muraoka, Kawasaki (JP); Masatoshi Hodotsuka, Saitama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 16/997,991

(22) Filed: Aug. 20, 2020

(65) Prior Publication Data

US 2020/0376428 A1 Dec. 3, 2020

Related U.S. Application Data

(62) Division of application No. 16/201,025, filed on Nov. 27, 2018, now Pat. No. 10,850,227.

(30) Foreign Application Priority Data

Nov. 28, 2017 (JP) .............................. JP2017-228165
Feb. 1, 2018 (JP) .............................. JP2018-016606

(51) Int. Cl.
*B01D 53/14* (2006.01)
*B01D 53/18* (2006.01)
(Continued)

(52) U.S. Cl.
CPC ..... *B01D 53/1493* (2013.01); *B01D 53/1475* (2013.01); *B01D 53/18* (2013.01);
(Continued)

(58) Field of Classification Search
None
See application file for complete search history.

(56) References Cited

U.S. PATENT DOCUMENTS

| 4,112,052 A | 9/1978 | Sartori et al. |
| 4,336,233 A | 6/1982 | Appl et al. |

(Continued)

FOREIGN PATENT DOCUMENTS

| CN | 103505994 A | 1/2014 |
| JP | 2871334 | 3/1999 |

(Continued)

OTHER PUBLICATIONS

Singto et al., "Synthesis of new amines for enhanced carbon dioxide (CO2) capture performance: The effect of chemical structure on equilibrium solubility, cyclic capacity, kinetics of absorption and regeneration, and heats of absorption and regeneration." Separation and Purification Tech., vol. 167 (2016), 97-107.*

*Primary Examiner* — Daniel Berns
(74) *Attorney, Agent, or Firm* — Oblon, McClelland, Maier & Neustadt, L.L.P.

(57) ABSTRACT

Disclosed herein are acid gas absorbents that afford high acid gas ($CO_2$) absorption amount per unit volume and high absorption speed and can prevent the absorbent components from diffusing. The acid gas absorbent contains an amine (Continued)

compound of the formula (1) and a cyclic amine compound of the formula (3) or (3'):

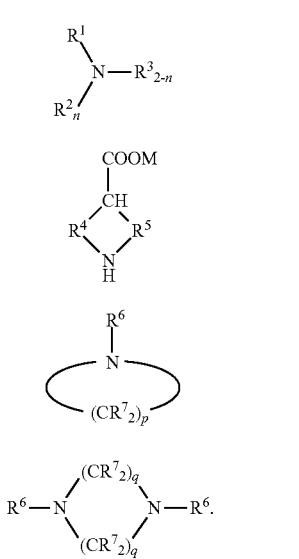

3 Claims, 1 Drawing Sheet

(51) Int. Cl.
*B01D 53/78* (2006.01)
*B01D 53/62* (2006.01)

(52) U.S. Cl.
CPC ............ *B01D 53/62* (2013.01); *B01D 53/78* (2013.01); *B01D 53/1425* (2013.01); *B01D 2252/20426* (2013.01); *B01D 2252/20431* (2013.01); *B01D 2252/20442* (2013.01); *B01D 2252/20447* (2013.01); *B01D 2252/20468* (2013.01); *B01D 2252/20484* (2013.01); *B01D 2252/20489* (2013.01); *B01D 2252/20494* (2013.01); *B01D 2252/504* (2013.01); *B01D 2252/602* (2013.01); *B01D 2257/304* (2013.01); *B01D 2257/308* (2013.01); *B01D 2258/0283* (2013.01)

(56) References Cited

U.S. PATENT DOCUMENTS

| | | | |
|---|---|---|---|
| 6,036,931 | A | 3/2000 | Yoshida et al. |
| 7,374,734 | B2 | 5/2008 | Grossman et al. |
| 7,759,285 | B2 | 7/2010 | Shim et al. |
| 8,034,166 | B2 | 10/2011 | Asprion et al. |
| 8,597,418 | B2 | 12/2013 | Inoue et al. |
| 9,409,119 | B2 | 8/2016 | Murai et al. |
| 9,636,628 | B2 | 5/2017 | Higashi et al. |
| 2009/0199713 | A1 | 8/2009 | Asprion et al. |
| 2011/0185902 | A1 | 8/2011 | Wagner et al. |
| 2013/0343974 | A1 | 12/2013 | Murai et al. |
| 2014/0290483 | A1 | 10/2014 | Delfort et al. |
| 2016/0296882 | A1 | 10/2016 | Murai et al. |

FOREIGN PATENT DOCUMENTS

| | | |
|---|---|---|
| JP | 2066-518662 | 8/2006 |
| JP | 2008-136989 | 6/2008 |
| JP | 2008-307519 | 12/2008 |
| JP | 2011-194388 | 10/2011 |
| JP | 2012-143745 | 8/2012 |
| JP | 2012-143760 | 8/2012 |
| JP | 2014-4533 | 1/2014 |
| JP | 5659127 B2 | 1/2015 |
| JP | 5659128 B2 | 1/2015 |
| JP | 2016-198714 | 12/2016 |
| JP | 2017-35669 | 2/2017 |
| JP | 2017-196547 | 11/2017 |
| JP | 2018-122278 | 8/2018 |
| WO | WO 2013/118819 A1 | 8/2013 |

* cited by examiner

ACID GAS ABSORBENT, ACID GAS REMOVAL METHOD, AND ACID GAS REMOVAL DEVICE

CROSS REFERENCE TO RELATED APPLICATIONS

This application is a divisional of U.S. application Ser. No. 16/201,025, filed on Nov. 27, 2018, which is based upon and claims the benefit of priority from the prior Japanese Patent Application No. 2017-228155 filed on Nov. 28, 2017, and No. 2018-16606, filed on Feb. 1, 2018, the entire contents all of which are incorporated herein by reference.

FIELD

Embodiments described herein relate generally to acid gas absorbents, acid gas removal methods, and acid gas removal devices.

BACKGROUND

In recent years, the greenhouse effect due to the rising carbon dioxide ($CO_2$) concentration has been pointed out as one factor of the global warming phenomenon, and international countermeasures for global-scale environmental protection are imperative. $CO_2$ generation is attributable much to industrial activities, and the general feeling of momentum for suppressing $CO_2$ emission in the environment is rising.

As technologies for suppressing the rise in the concentration of acid gas typified by $CO_2$, there are development of energy saving products, technologies of utilizing acid gas as resources, isolation and storage of acid gas, conversion to alternative energy such as natural energy and atomic energy which cause no acid gas emission, and the like, and as one of them, a technology of separating and recovering acid gas emissions is known.

Examples of acid gas separation technologies that have been studied up to now include an absorption method, a membrane separation method, a cryogenic method, and the like. Among others, an absorption method is under consideration for application to factories and power plants because the method is suitable for treating gas in bulk and with efficiency.

As methods applicable to thermal power plants that consume fossil fuel and other places, known are a method in which exhaust gas generated in combustion of fossil fuel (coal, petroleum, natural gas, and the like) is brought into contact with a chemical absorbent to thereby remove and recover $CO_2$ from the combustion exhaust gas, and a method in which the recovered $CO_2$ is then stored. In addition, using a chemical absorbent to remove an acid gas such as hydrogen sulfide ($H_2S$) in addition to $CO_2$ has been proposed.

Generally, as chemical absorbents used in the absorption method, alkanolamines typified by monoethanolamines (MEA) have been developed since the 1930s, and they are still used at present. This method is economically efficient and makes it easy to make a larger removal device.

Examples of alkanolamines used in absorption methods include 2-amino-2-methylpropanolamine, methylaminoethanol, ethylaminoethanol, propylaminoethanol, diethanolamine, methyldiethanolamine, dimethylethanolamine, diethylethanolamine, triethanolamine, dimethylamino-1-methylethanol, and the like.

In cases where these amines are singly used, the $CO_2$ absorption speed is not sufficient, because of which compounds effective for reaction promotion may be usually used together. Cyclic diamines are known as compounds effective for reaction promotion, but these have a problem in that they have a high vapor pressure and diffuse easily.

In this view, there is a demand for development of a novel absorbing liquid having an excellent $CO_2$ absorption characteristic and an improved diffusion characteristic.

A problem to be solved by the present invention is to provide an acid gas absorbent that absorbs a large amount of acid gas and has a low diffusion characteristic, an acid gas removal method using the same, and an acid gas removal device.

Solution to Problem

An acid gas absorbent (first acid gas absorbent) according to an embodiment of the present invention includes an amine compound represented by the following general formula (1) and an amino-acid salt compound represented by the following general formula (2).

(1)

[wherein $R^1$ represents a substituted or unsubstituted $C_1$-$C_4$ alkyl group; $R^2$ represents a $C_3$-$C_5$ hydroxyalkyl group in which a hydroxyl group is bound to the carbon atom adjacent to an end carbon atom of $R^2$; $R^3$ represents a $C_2$-$C_3$ linear or branched hydroxyalkyl group having a hydroxyl group bound therein; and n is 1 or 2.]

(2)

[wherein M represents an alkali metal; and $R^4$ and $R^5$ independently represent a $C_0$-$C_4$ alkylene group, to any carbon atom of which a carboxylic base or a $C_1$-$C_4$ alkyl group may be bound, with the proviso that the total carbon number of $R^4$ and $R^5$ alkylene groups is 1 or more but 4 or less.]

An acid gas absorbent (second acid gas absorbent) according to an embodiment of the present invention includes an amine compound represented by the following general formula (1) and a cyclic amine compound represented by the following general formula (3) or (3').

(1)

[wherein $R^1$ represents a substituted or unsubstituted $C_1$-$C_4$ alkyl group; $R^2$ represents a $C_3$-$C_5$ hydroxyalkyl group in which a hydroxyl group is bound to the carbon atom adjacent to an end carbon atom of $R^2$; $R^3$ represents a $C_2$-$C_3$ linear or branched hydroxyalkyl group having a hydroxyl group bound therein; and n is 1 or 2.]

[wherein $R^6$ and $R^7$ independently represent a hydrogen atom, a hydroxyl group, a $C_1$-$C_8$ hydroxy alkyl group, or an amino alkyl group, with the proviso that $R^6$ in the general formula (3) is a hydrogen atom; at least one of two $R^6$s in the formula (3') is a hydrogen atom, and, when $R^6$s are both hydrogen atoms, at least one of $R^7$s is a $C_1$-$C_8$ hydroxyalkyl group or aminoalkyl group; p is an integer of 3 to 8; q is an integer of 2 to 4; and the heterocycle of the cyclic amine compound can contain not only a nitrogen atom and a carbon atom but also an oxygen atom in the heterocycle.]

An acid gas absorbent according to the embodiment can increase the absorbed amount of an acid gas such as carbon dioxide and reduce the diffusion characteristic of a reaction promoter.

This acid gas absorbent requires smaller energy for separating acid gas. Accordingly, the embodiment of the present invention can provide a method and a device which can remove acid gas efficiently with low energy.

DETAILED DESCRIPTION

Below, embodiments of the present invention will be described in detail.

In the following description of the embodiments, the acid gas is carbon dioxide, and the acid gas absorbent according to the embodiment of the present invention can afford the same effects on other acid gases such as hydrogen sulfide. The acid gas absorbent according to the embodiment is particularly suitable for absorption of an oxidizing gas such as carbon dioxide or hydrogen sulfide.

[First Acid Gas Absorbent]

A first acid gas absorbent according to an embodiment of the present invention includes a specific amine compound represented by the following general formula (1) and a specific amino-acid salt compound represented by the following general formula (2).

<Amine Compound>

The first acid gas absorbent according to the embodiment of the present invention contains an amine compound represented by the following general formula (1) as an essential component.

[wherein $R^1$ represents a substituted or unsubstituted $C_1$-$C_4$ alkyl group; $R^2$ represents a $C_3$-$C_5$ hydroxyalkyl group in which a hydroxyl group is bound to the carbon atom adjacent to an end carbon atom of $R^2$; $R^3$ represents a $C_2$-$C_3$ linear or branched hydroxyalkyl group having a hydroxyl group bound therein; and n is 1 or 2.]

As the $R^1$ alkyl group in the general formula (1), a methyl group, an ethyl group, a propyl group, or a butyl group can be used. It is particularly preferably a methyl group or an ethyl group.

$R^2$ represents a $C_3$-$C_5$ hydroxyalkyl group in which a hydroxyl group is bound to the carbon atom adjacent to an end carbon atom of $R^2$. In other words, $R^2$ is a $C_3$-$C_5$ hydroxyalkyl group in which a hydroxy group is bound to the (m-1)-position carbon atom of a $C_m$ alkyl group. Preferable examples of $R^2$ include 2-hydroxypropyl corresponding to 2-propanol, 2-hydroxybutyl corresponding to 2-butanol, 2-hydroxypentyl corresponding to 2-pentanol, and the like.

$R^3$ is a $C_2$-$C_3$ linear or branched hydroxyalkyl group having a hydroxyl group bound therein (but excluding those falling under $R^2$). Preferable examples of $R^3$ include 2-hydroxyethyl, 2-hydroxypropyl, 2-hydroxybutyl, and the like.

Preferable examples of amine compounds in the general formula (1) include
1-[(2-hydroxyethyl)methylamino]-2-propanol,
1-[(2-hydroxyethyl)ethylamino]-2-propanol,
1-[(2-hydroxyethyl)propylamino]-2-propanol,
1-[(2-hydroxyethyl)butylamino]-2-propanol,
1-[(3-hydroxypropyl)methylamino]-2-propanol,
1-[(3-hydroxypropyl)ethylamino]-2-propanol,
1-[(3-hydroxypropyl)propylamino]-2-propanol,
1-[(3-hydroxypropyl)butylamino]-2-propanol,
4-[(2-hydroxyethyl)methylamino]-2-butanol,
4-[(2-hydroxyethyl)ethylamino]-2-butanol,
4-[(2-hydroxyethyl)propylamino]-2-butanol,
4-[(2-hydroxyethyl)butylamino]-2-butanol,
4-[(3-hydroxypropyl)methylamino]-2-butanol,
4-[(3-hydroxypropyl)ethylamino]-2-butanol,
4-[(3-hydroxypropyl)propylamino]-2-butanol,
4-[(3-hydroxypropyl)butylamino]-2-butanol, and the like.

These compounds can be used singly or in combination of two or more kinds.

The acid gas absorbent preferably contains a specific amine compound represented by the general formula (1) in an amount of 10 to 60 mass %.

Generally, a higher concentration of the amine component results in a larger carbon dioxide absorption amount and separation amount per unit capacity and a higher carbon dioxide absorption speed and separation speed, and thus is preferable in terms of energy consumption, size of plant facilities, and treatment efficiency.

However, too high a concentration of the amine component may cause a rise in the absorbing liquid viscosity, and the like. The amine compound of the general formula (1) at a concentration of 60 mass % or less does not exhibit such a tendency. In addition, the amine compound of the general formula (1) at a concentration of 10 mass % or more can afford a sufficient carbon dioxide absorption amount and absorption speed and afford excellent treatment efficiency.

The acid gas absorbent containing the amine compound of the general formula (1) at a concentration in the range of 10 to 60 mass % achieves not only a high carbon dioxide absorption amount and carbon dioxide absorption speed but also a high carbon dioxide separation amount and carbon dioxide separation speed when used for carbon dioxide recovery, and accordingly is advantageous in that it enables carbon dioxide to be recovered efficiently. The contained amount of the amine compound represented by the general formula (1) is preferably 20 to 50 mass %.

<Amino-Acid Salt Compound>

Conventionally, the use of an amino-acid salt as an absorbing liquid is known. However, there is a demand for further enhancement of the acid gas absorption amount and the diffusion characteristic.

The present inventors have found out that an amino-acid salt having a specific cyclic structure acts as a reaction promoter for an absorbing liquid having an amino compound as a main agent and enhances the acid gas absorption amount and the diffusion characteristic.

The amino-acid salt compound used for the acid gas absorbent according to the embodiment of the present invention is represented by the following general formula (2).

(2)

[wherein M represents an alkali metal; and $R^4$ and $R^5$ independently represent a $C_0$-$C_4$ alkylene group, to any carbon atom of which a carboxylic base or a $C_1$-$C_4$ alkyl group may be bound, with the proviso that the total carbon number of $R^4$ and $R^5$ alkylene groups is 1 or more but 4 or less.]

M can be any alkali metal such as lithium, sodium, potassium, rubidium, or cesium, and sodium and potassium are particularly preferable in the embodiment of the present invention in that the molecular weight of the amino-acid salt does not become too large.

$R^4$ and $R^5$ independently represent a $C_0$-$C_4$ alkylene group. Here, a $C_0$ alkylene chain specifically means that. $R^4$ (or $R^5$) is not present and that the carbon atom of CH and the nitrogen atom of NH are bound together with no other atom nor the like therebetween.

For example, when $R^4$ is such a $C_0$ alkylene chain, the carbon atom of CH and the nitrogen atom of NH are bound together with no other atom nor the like therebetween, and in addition, the carbon atom of CH and the nitrogen atom of NH are bound together to form a ring with any of a methylene group, ethylene group, propylene group, and butylene group as $R^5$ therebetween.

In these alkylene groups, $R^4$ and $R^5$, (in other words, methylene, ethylene, propylene, or butylene), part of their hydrogen atoms may be substituted with a $C_1$-$C_3$ alkyl group.

The total carbon number of $R^4$ and $R^5$ alkylene groups is preferably 1 or more but 4 or less. In particular, those having a total carbon number of 3 or less are preferable in terms of reaction promotion effect. In terms of solubility, those in which the total carbon number of $R^4$ and $R^5$ is 1 to 3 are preferable, and in particular, those having a carbon number of 3 are preferable.

In the embodiment of the present invention, specific preferable examples of amino-acid salts include the following compounds. Examples thereof include sodium ethyleneimine-2-carboxylate, sodium azetidine-2-carboxylate, sodium azetidine-3-carboxylate, sodium pyrrolidine-2-carboxylate, sodium pyrrolidine-3-carboxylate, sodium 4-hydroxy pyrrolidine-2-carboxylate, sodium piperidine-2-carboxylate, sodium piperidine-3-carboxylate, sodium piperidine-4-carboxylate, potassium salts of these carboxylic acids, and the like. These compounds can be used singly or in combination of two or more kinds.

Among these, particularly pyrrolidine derivatives and piperidine derivatives are desirable in terms of enhancing the carbon dioxide absorption amount and absorption speed of the acid gas absorbent.

The acid gas absorbent according to the embodiment of the present invention contains at least one of the amino-acid salts represented by the above-mentioned general formula (2).

The specific amino-acid salt represented by the general formula (2) has a negligibly small vapor pressure, compared with a cyclic diamine such as piperazine, so that, when used as an acid gas absorbent for acid gas absorption methods and acid gas absorption devices, the amino-acid salt makes it possible to suppress the diffusion of the absorbent out of a reaction device.

The amino-acid salt represented by the general formula (2) is different in structure from a usual chain amino-acid salt, has high reactivity to an acid gas (for example, carbon dioxide ($CO_2$), hydrogen sulfide ($H_2S$), and carbonyl sulfide (COS)), has excellent solubility in water, and hence is less likely to precipitate when the absorbent absorbs the acid gas.

Accordingly, the acid gas absorbent according to the embodiment of the present invention absorbs a large amount of acid gas and achieves the suppression of precipitation when absorbing the acid gas. At the same time, the acid gas absorbent achieves the suppression of the diffusion characteristic of amine which is a component of the absorbent and hence can remarkably reduce the amount of amine emitted into the air. In particular, a cyclic α-amino-acid salt of the general formula (2) (in other words, one having $R^4$ and $R^5$ alkylene chains having a total carbon number of 1) has excellent solubility in particular, and hence is less likely to precipitate when the absorbent absorbs acid gas.

The acid gas absorbent contains the amino-acid salt compound represented by the general formula (2) in an amount of preferably 1 to 20 mass %, particularly preferably 5 to 15 mass %, (with respect to the whole amount of the acid gas absorbent as 100 mass %). The acid gas absorbent containing the amino-acid salt of the general formula (2) in an amount of less than 1 mass % may fail to sufficiently achieve the effect of enhancing the acid gas absorption speed. The above-mentioned specific amine acid contained in an amount of more than 20 mass % causes the viscosity of the absorbent to be too high and may even reduce the reactivity.

In this way, with the acid gas absorbent according to the embodiment of the present invention containing an amino-acid salt compound of the general formula (2) and an amine compound of the general formula (1), the acid gas absorption amount (particularly, carbon dioxide) per unit mole and the acid gas absorption amount and acid gas absorption speed per unit volume of the acid gas absorbent have been further enhanced. In addition, the energy for separating acid gas (the acid gas separation energy) is reduced, and thus the energy for regenerating the acid gas absorbent can be reduced.

Further, the acid gas absorbent can contain a cyclic amine compound such as piperazine, if necessary.

<Other Components (Optional Components and the Like)>

The acid gas absorbent according to the embodiment of the present invention contains an amine represented by the general formula (1) and an amino-acid salt compound represented by the general formula (2), and is suitable as an acid gas absorbent for, for example, an acid gas absorption method or an acid gas absorption device when mixed with a solvent such as water and, if necessary, with any kind of ancillary material and the like. Here, specific examples of ancillary materials encompass antioxidants, pH adjustors, defoaming agents, anticorrosives, and the like.

In cases where water is used as a solvent, the water content is preferably 20 to 60 mass %, particularly preferably 30 to 60 mass % (with respect to the whole amount of the acid gas absorbent as 100 mass %). The water content in this range is preferable in that it suppresses a rise in the viscosity of the absorbing liquid and suppresses foaming when the absorbing liquid absorbs carbon dioxide.

Preferable specific examples of antioxidants include dibutylhydroxytoluene (BHT), butylhydroxyanisole (BHA), sodium erythorbate, sodium nitrite, sulfur dioxide, 2-mercaptoimidazole, 2-mercaptobenzimidazole, and the like. In cases where an antioxidant is used, the antioxidant content is preferably 0.01 to 1 mass %, particularly preferably 0.1 to 0.5 mass %, (with respect with the whole amount of the acid gas absorbent as 100 mass %). Antioxidants can prevent the degradation of the acid gas absorbent and enhance the life thereof.

Preferable specific examples of defoaming agents include silicone-based defoaming agents and organic defoaming agents. When a defoaming agent is used, the defoaming agent content is preferably 0.00001 to 0.001 mass %, particularly preferably 0.0005 to 0.001 mass % (with respect to the whole amount of the acid gas absorbent as 100 mass %). Defoaming agents can prevent the foaming of the acid gas absorbent, suppress a reduction in the acid gas absorption efficiency and separation efficiency, and prevent the acid gas absorbent from suffering, for example, a reduction in the flowability and circulation efficiency.

Preferable specific examples of anticorrosives include phosphate esters, tolyltriazoles, and benzotriazoles. When an anticorrosive is used, the anticorrosive content is preferably 0.00003 to 0.0008 mass %, particularly preferably 0.00005 to 0.005 mass % (with respect to the whole amount of the acid gas absorbent as 100 mass %). Such an anticorrosive can prevent the corrosion of plant facilities and enhance the lifetime thereof.

In addition, the acid gas absorbent according to the embodiment of the present invention can suitably be mixed with amino alcohol, if necessary, and then be used. Using amino alcohol makes it possible to attempt to improve or enhance, for example, the absorption amount, emission amount, absorption speed, and the like of the acid gas absorbent.

Examples of suitable amino alcohols include monoethanolamine, 2-amino-2-methyl-1-propanol, 2-amino-2-methyl-1,3-dipropanol, diethanolamine, bis(2-hydroxy-1-methylethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino)ethanol, 3-ethylaminopropanol, triethanolamine, diethanolamine, and the like. These compounds can be used singly or in combination of two or more kinds.

Among these, a preferable alkanolamine is at least one selected from the group consisting of 2-(isopropylamino)ethanol and 2-amino-2-methyl-1-propanol in terms of enhancing the reactivity between the amine compound of the general formula (1) and acid gas.

When an amino alcohol such as these is used, the amino alcohol is preferably 1 to 30 volume % with respect to 100 volume % of the amine compound represented by the general formula (1).

As above-mentioned, the acid gas absorbent according to the present embodiment can make it possible to increase the absorbed amount of an acid gas such carbon dioxide and the like and reduce the diffusion characteristic of a reaction promoter. In addition, less energy is required for recovery of acid gas. Further, the use of the amine compound having a plurality of hydroxyl groups, which are polar groups, in the molecule allows the diffusion characteristic to be suppressed, whereby the diffusion out of a reaction device is suppressed. This enables long time stable acid gas treatment even when a reaction promoter having a low vapor pressure is used in combination. Having high reactivity to acid gas (for example, carbon dioxide ($CO_2$), hydrogen sulfide ($H_2S$), and carbonyl sulfide (COS) and excellent solubility in water is less likely to cause precipitation when the acid gas absorbent absorbs the acid gas.

[Second Acid Gas Absorbent]

A second acid gas absorbent according to an embodiment of the present invention includes a specific amine compound represented by the following general formula (1) and a cyclic amine compound represented by the following general formula (3) or (3').

<Amine Compound>

The second acid gas absorbent according to the present invention contains an amine compound represented by the following general formula (1) as an essential component. In this regard, as an amine compound in the second acid gas absorbent, any one of those described in detail in the section of the first acid gas absorbent according to the present invention can be used.

The second acid gas absorbent according to this embodiment of the present invention contains the amine compound represented by the general formula (1) in an amount of preferably 10 to 60 mass % (with respect to the whole amount of the acid gas absorbent as 100 mass %).

A higher concentration of the amine compound represented by the general formula (1) results in a larger acid gas absorption amount and separation amount per unit capacity and a higher carbon dioxide absorption speed and separation speed. This is advantageous in that carbon dioxide can be efficiently recovered, and is preferable in terms of energy consumption, size of plant facilities, and treatment efficiency. However, too high a concentration of this amine compound will not allow water contained in the absorbing liquid to sufficiently exert the function as an activator for acid gas absorption. In addition, too high a concentration of this amine compound causes a rise in the viscosity of the absorbing liquid to be non-negligible.

<Cyclic Amine Compound>

The acid gas absorbent according to the embodiment of the present invention contains a cyclic amine compound represented by the following general formula (3) or (3').

[wherein $R^5$ and $R^7$ independently represent a hydrogen atom, a hydroxyl group, a $C_1$-$C_8$ hydroxy alkyl group, or an amino alkyl group, with the proviso that $R^5$ in the general formula (3) is a hydrogen atom; at least one of two $R^6$s in the formula (3') is a hydrogen atom, and, when $R^6$s are both hydrogen atoms, at least one of $R^7$s is a $C_1$-$C_8$ hydroxyalkyl group or aminoalkyl group; p is an integer of 3 to 8; q is an integer of 2 to 4; and the heterocycle of the cyclic amine compound can contain not only a nitrogen atom and a carbon atom but also an oxygen atom in the heterocycle.]

Preferably, $R^7$ is particularly a hydrogen atom, a methyl group, a hydroxyl group, a hydroxymetyl group, or a hydroxyethyl group. p is preferably 3 to 8, and q is particularly preferably 2 to 4.

Preferable examples of the cyclic amine compound represented by the general formula (3) or (3') include 2-azetidilmethanol, 2-(2-aminoethyl)azetidine, 2-pyrrolidylmethanol, 2-(2-aminoethyl)pyrrolidine, 2-piperidinemethanol, 3-piperidineethanol, 2-(2-aminoethyl)pyrrolidine, 1-(2-hydroxy ethyl)piperazine, 2-(hydroxymethyl)piperazine, 3-hydroxypyrrolidine, 3-pyrrolidinemethanol, 2-(2-hydroxyethyl)pyrrolidine, 4-piperidineethanol, 2-(hydroxy methyl) piperidine, 3-hydroxypiperidine, 4-hydroxypiperidine, 4-(hydroxymethyl)piperidine, and the like.

The cyclic amine compound represented by the general formula (3) and the cyclic amine compound represented by the general formula (3') can be used together.

In the present embodiment, for example, an aqueous solution of an absorbent composed of, for example, the amine compound (1) and the cyclic amine compound (3) or (3') can preferably be used as an acid gas absorbent. Such an add gas absorbent is particularly preferable in terms of the carbon dioxide absorption amount per unit mole and the carbon dioxide absorption amount and carbon dioxide absorption speed per unit volume of the acid gas absorbent. In addition, the energy for separating an acid gas after absorption of carbon dioxide (the acid gas separation energy) is reduced, and the energy for regenerating the acid gas absorbent can be reduced.

Further, the acid gas absorbent can contain a cyclic amine compound other than represented by the general formula (3) or (3'), if necessary. Examples of cyclic amine compounds include azetidine, 1-methylazetidine, 1-ethylazetidine, 2-methylazetidine, 2-azetidilmethanol, 2-(2-aminoethyl) azetidine, pyrrolidine, 1-methylpyrrolidine, 2-methylpyrrolidine, 2-butylpyrrolidine, piperidine, 1-methylpiperidine, 2-ethylpiperidine, 3-propylpiperidine, 4-ethylpiperidine, hexahydro-1H-azepine, piperazine, piperazine derivative, and the like.

Among these, particularly piperazine derivatives are desirable in terms of enhancing the carbon dioxide absorption amount and absorption speed of the acid gas absorbent.

Piperazine derivatives are secondary amine compounds, and, in general, the bonding of the nitrogen atom of the secondary amino group to carbon dioxide forms a carbamate ion and thereby contributes to enhancing the absorption speed in the initial stage of reaction. Further, the nitrogen atom of the secondary amino group plays a role in converting the carbon dioxide bound thereto into a bicarbonate ion ($HCO_3^-$) and contribute to enhancing the speed in the later stages of reaction.

The piperazine derivative is preferably at least one of 2-methylpiperazine, 2,5-dimethylpiperazine, and 2,6-dimethylpiperazine. In addition, hexamethylenetetramine can be used in the same way as the cyclic amine compound, of the general formula (3).

The acid gas absorbent contains the cyclic amine compound represented by the general formula (3) or (3') in an amount of preferably 1 to 50 mass % or 3 to 50 mass % (with respect to the whole amount of the acid gas absorbent as 100 mass %). The acid gas absorbent containing the cyclic amine compound of the general formula (3) or (3') in an amount of less than 1 mass % may fail to sufficiently achieve the effect of enhancing the acid gas absorption speed. The above-mentioned specific cyclic amine contained in an amount of more than 50 mass % causes the viscosity of the absorbent to be too high and may even reduce the reactivity.

In addition, the following alkanolamine can be used for the acid gas absorbent according to the embodiment.

Examples of alkanolamines include monoethanolamine, 2-amino-2-methylpropanol, 2-amino-2-methyl-1,3-dipropanol, diethanolamine, bis(2-hydroxy-1-methylethyl)amine, methyldiethanolamine, dimethylethanolamine, diethylethanolamine, triethanolamine, dimethylamino-1-methylethanol, 2-methylaminoethanol, 2-ethylaminoethanol, 2-propylaminoethanol, n-butylaminoethanol, 2-(isopropylamino) ethanol, 3-ethylaminopropanol, triethanolamine, diethanolamine, and the like.

Among others, examples of alkanolamines include at least one selected from the group consisting of 2-(isopropylamino)ethanol, 2-(ethylamino)ethanol, and 2-amino-2-methyl-1-propanol in terms of enhancing the reactivity to acid gas.

The acid gas absorbent may contain not only the above-mentioned amine compound and reaction promoter but also an anticorrosive based on phosphoric acid and the like for prevention of corrosion of plant facilities, a defoaming agent based on silicone and the like for prevention of foaming, an antioxidant for prevention of degradation of the acid gas absorbent, and the like.

In this way, with the acid gas absorbent according to the embodiment of the present invention containing an amine compound of the general formula (1) and a cyclic amine compound of the general formula (3) or (3'), the acid gas absorption amount (particularly, carbon dioxide) per unit mole and the acid gas absorption amount and acid gas absorption speed per unit volume of the acid gas absorbent have been further enhanced. The energy for separating an acid gas (the acid gas separation energy) is reduced, and thus the energy for regenerating the acid gas absorbent can be reduced.

<Other Components (Optional Components and the Like)>

The acid gas absorbent according to the embodiment of the present invention contains an amine compound represented by the general formula (1) and a cyclic amine compound represented by the general formula (3) or (3'), and is suitable as an acid gas absorbent for, for example, an acid gas absorption method or an acid gas absorption device when mixed with a solvent such as water and, if necessary, with any kind of ancillary material and the like. Here, specific examples of ancillary materials encompass antioxidants, pH adjustors, defoaming agents, anticorrosives, and the like. As such an ancillary material of any kind, any one of those described in detail in the section of the second acid gas absorbent according to the present invention can be used.

In cases where water is used as a solvent, the water content is preferably 20 to 60 mass %, particularly preferably 30 to 60 mass %, (with respect to the whole amount of the acid gas absorbent as 100 mass %). The water content in this range is preferable in that it suppresses a rise in the viscosity of the absorbing liquid and suppresses foaming when the absorbing liquid absorbs carbon dioxide.

<Acid Gas Removal Method>

The acid gas removal method according to an embodiment of the present invention is a method in which a gas containing acid gas is brought into contact with the first or second acid gas absorbent, whereby the acid gas is removed from the gas containing the acid gas.

The acid gas removal method according to the embodiment of the present invention has, as a basic configuration, a step of allowing the above-mentioned acid gas absorbent according to the embodiment of the present invention to absorb acid gas (the absorption step) and a step of separating the acid gas from the acid gas absorbent according to the embodiment of the present invention which has absorbed the acid gas.

In other words, the basic configuration of the acid gas removal method according to the embodiment of the present invention includes: a step of bringing a gas containing an acid gas (for example, exhaust gas and the like) into contact with the acid gas absorbent to allow the acid gas absorbent to absorb the acid gas (the acid gas absorption step); and a step of heating the acid gas absorbent that has absorbed the acid gas and been obtained in the acid gas absorption step, thereby separating and removing the acid gas (the acid gas separation step).

The method of bringing a gas containing an acid gas into contact with an aqueous solution containing the acid gas absorbent is not limited to a particular one but can be carried out, for example, as a method in which a gas containing an acid gas is sparged in the acid gas absorbent to allow the absorbent to absorb the acid gas, a method in which the acid gas absorbent is sprayed in mist form into a gas flow containing an acid gas (a spraying or spray method), or a method in which a gas containing an acid gas is brought into counterflow contact with the acid gas absorbent in an absorber filled with a porcelain-made or metal mesh filler.

When the aqueous solution is allowed to absorb a gas containing an acid gas, a preferable temperature of the acid gas absorbent is usually room temperature or higher but 60° C. or less. It is more preferably 50° C. or less, particularly preferably 20 to 45° C. The lower the temperature is, the larger the acid gas absorption amount is, and the lower limit value of the treatment temperature can be determined in accordance with the process gas temperature, the heat recovery target, and the like. A pressure under which the acid gas is absorbed is usually atmospheric pressure. A higher pressure can be applied to increase the absorbing performance, but operation under atmospheric pressure is preferable to suppress energy consumption required for the compression.

Examples of methods of separating acid gas from the acid gas absorbent with the acid gas absorbed therein and recovering pure or high concentration carbon dioxide include: a method in which the acid gas absorbent is heated and frothed in a furnace to separate the acid gas, in the same manner as in a distillation method; a method in which the acid gas absorbent is heated with its liquid interface expanded in a plate column, a spray tower, or a regeneration tower containing a porcelain-made or metal mesh filler; and the like. This causes the acid gas to be liberated and released from carbamic acid anions and bicarbonate ions.

A temperature at which acid gas is separated from the acid gas absorbent is usually 70° C. or more, preferably 80° C. or more, more preferably 90 to 120° C. The higher the temperature is, the larger the acid gas separation amount is, but increasing the temperature increases the energy required for heating the absorbing liquid, and accordingly the temperature can be determined in accordance with the process gas temperature, the heat recovery target, and the like. A pressure at which acid gas is separated can be usually in the order of 1 to 3 atm. A lower pressure can be applied to increase the separating performance, but operation in the above-mentioned range is preferable to suppress energy consumption required for the decompression.

The acid gas absorbent from which the acid gas has been separated can be returned to the acid gas absorption step to be cyclically used (recycled). In addition, the heat generated when the acid gas is absorbed is generally cooled using a heat exchanger through heat exchange for preheating an aqueous solution that is injected into a regenerator in a recycle process of the aqueous solution.

The purity of the acid gas thus recovered is usually in the order of 95 to 99 volume %, which is an extremely high purity. This pure acid gas or high concentration acid gas can be used as chemical products, synthetic raw materials for high polymer substances, cooling agents for food freezing, or the like. In addition, it is also possible to isolate and store the recovered acid gas underground, a technology for which is currently being developed.

Among the above-mentioned steps, the step in which the acid gas is separated from the acid gas absorbent to thereby regenerate the acid, gas absorbent is the part in which the largest amount of energy is consumed, and in this step, the energy in the order of 50 to 80% of that for the whole steps may be consumed. Accordingly, the reduction in energy consumption in the acid gas absorbent regeneration step enables a reduction in cost in the acid gas absorption and separation step and enables economically advantageous removal of acid gas from exhaust gas.

In the present embodiment, using the acid gas absorbent according to the above-mentioned embodiment enables a reduction in the energy required for acid gas separation (the regeneration step). Owing to this, the carbon dioxide absorption and separation step can be carried out under economically advantageous conditions.

In addition, the amine compound according to the above-mentioned embodiment has remarkably high corrosion-prevention properties against metal materials such as carbon steel, compared with alkanolamines such as 2-aminoethanol which are conventionally used as acid gas absorbents. Accordingly, using an acid gas removal method with such an acid gas absorbent eliminates the necessity to use high-cost high-grade corrosion-resistant steel in, for example, plant construction, and is advantageous in terms of cost.

<Acid Gas Removal Device>

The acid gas removal device according to an embodiment of the present invention is an acid gas removal device having: an absorber for bringing a gas containing an acid gas in contact with the first or second acid gas absorbent, allowing this acid gas absorbent to absorb the acid gas, thereby removing the acid gas from the gas containing the acid gas; and a regenerator for separating the acid gas from the acid gas absorbent having absorbed the acid gas, such that the acid gas absorbent is regenerated;

in which the acid gas absorbent regenerated in the regenerator is reused in the absorber.

Figure 1:
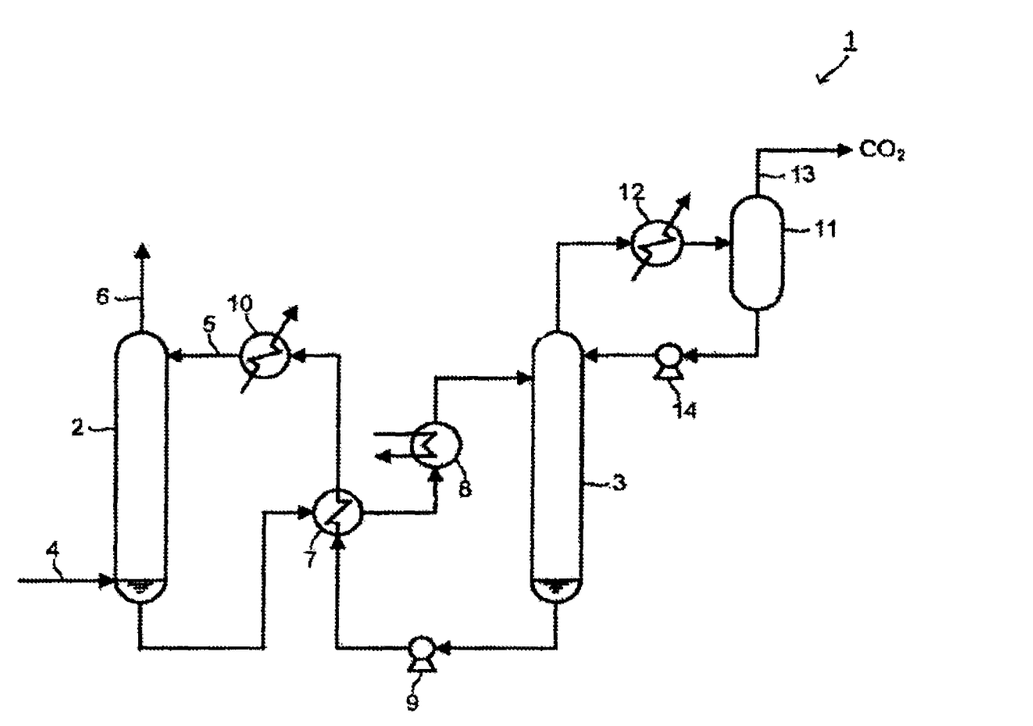
FIG. 1 is a schematic view of an acid gas removal device according to an embodiment.

FIG. 1 is a schematic view of an acid gas removal device according to an embodiment.

This acid gas removal device 1 includes: an absorber 2 in which a gas containing an acid gas (for example, exhaust gas) is brought into contact with an acid gas absorbent, which is allowed to absorb and remove the acid gas from the gas containing the acid gas; and a regenerator 3 in which the acid gas is separated from the acid gas absorbent having absorbed the acid gas, whereby the acid gas absorbent is regenerated. Below, an example in which the acid gas is carbon dioxide will be described.

As shown in FIG. 1, an exhaust gas containing carbon dioxide, such as combustion exhaust gas exhausted from a thermal power plant and the like, is introduced into the bottom of the absorber 2 through a gas supply inlet 4. This exhaust gas is pushed into the absorber 2 and brought into contact with an acid gas absorbent supplied through an acid gas absorbent supply inlet 5 at the top of the absorber 2. As the acid gas absorbent, the acid gas absorbent according to the above-mentioned embodiment is used.

The pH value of the acid gas absorbent has only to be adjusted to at least 9 or more, and it is favorable to select most suitable conditions, as appropriate, in accordance with the type, concentration, flow rate, and the like of harmful gases contained in the exhaust gas.

This acid gas absorbent may also contain, at any ratio, compounds such as a nitrogen-containing compound, an antioxidant, and a pH adjustor which enhance the carbon dioxide absorption performance, besides the amine compound and a solvent such as water.

In this way, the exhaust gas is brought into contact with the acid gas absorbent, whereby carbon dioxide in the exhaust gas is absorbed in the acid gas absorbent and removed. The exhaust gas from which carbon dioxide has been removed is exhausted out of the absorber 2 through a gas exhaust outlet 6.

The acid gas absorbent having absorbed carbon dioxide is transferred to a heat exchanger 7 and a heater 8, heated there, and transferred to a regenerator 3. The acid gas absorbent is transferred into the regenerator 3 and migrates from the top part to the bottom part in the regenerator 3, during which the acid gas in the acid gas absorbent is separated, whereby the acid gas absorbent is regenerated.

The acid gas absorbent regenerated in the regenerator 3 is transferred to the heat exchanger 7 and an absorbing liquid cooler 10 using a pump 9 and returned to the absorber 2 through the acid gas absorbent supply inlet 5.

At the same time, the acid gas separated from the acid gas absorbent is brought into contact with reflux water supplied from a reflux drum 11 in the top part of the regenerator 3, and then exhausted out of the regenerator 3.

The reflux water in which carbon dioxide is dissolved is cooled in a reflux cooler 12 and then separated, in the reflux drum 11, from the liquid component in which water vapor accompanied by carbon dioxide is condensed. This liquid component is introduced into an acid gas recovery step through a recovered acid gas line 13. Meanwhile, the reflux water from which the acid gas has been separated is transferred into the regenerator 3 using a reflux water pump 14.

According to the acid gas removal device 1 of the present embodiment, using the acid gas absorbent having an excellent acid gas absorption characteristic and separation characteristic enables high efficiency acid gas absorption and removal.

As above-mentioned, the first acid gas absorbent, second acid gas absorbent, acid gas removal methods, and acid gas removal devices according to some embodiments of the present invention have been described, but these embodiments are presented as examples and are not to limit the scope of the invention. These embodiments can be carried out in various other forms, and various omissions, substitutions, modifications, or additions can be made to the invention without departing from the spirit and scope of the invention. These embodiments and variations thereof are included in the spirit and scope of the invention and included in the scope of the inventions recited in CLAIMS and the equivalents of the inventions.

EXAMPLES

Below, embodiments of the present invention will be described in further detail with reference to Examples and Comparative Examples.

Example 1

In water, 1-[(2-hydroxyethyl)methylamino]-2-propanol and sodium pyrrolidine-2-carboxylate were dissolved so as to be 45 mass % and 5 mass % respectively to make a 50 ml aqueous solution (hereinafter referred to as an absorbing liquid). This absorbing liquid was filled into a test tube, heated at 40° C., and fed with a gas mixture flow containing 10 volume % carbon dioxide ($CO_2$) and 90 volume % nitrogen ($N_2$) at a gas flow rate of 400 mL/min; and the carbon dioxide ($CO_2$) concentration of the gas at the outlet of the test tube was measured using an infrared type gas concentration measurement device (the tradename "CGT-700", made by Shimadzu Corporation), whereby the absorption performance was evaluated.

In this regard, the absorption speed is a speed at ½ of the maximum acid gas absorption amount and calculated using the following: (½ of the maximum absorption amount)/(10 seconds before and after ½ of the maximum absorption amount is reached).

The carbon dioxide absorption amount of the absorbing liquid at 40° C. was 0.34 mol per 1 mol of the amine compound in the absorbing liquid; the carbon dioxide absorption amount at 120° C. was 0.04 mol per 1 mol of the amine compound in the absorbing liquid, and the recovery amount was 0.30 mol. The absorption speed was $5.3 \times 10^{-3}$ mol/mol/min. With regard to the diffusion characteristic, the absorbing liquid was fed with a nitrogen gas flow, and the concentration was measured from that portion of the absorbing liquid which accompanied the nitrogen gas. As a result, the diffusion characteristic was about 4 ppm.

Example 2

The absorbing liquid was prepared in the same manner as in Example 1 except that sodium piperidine-2-carboxylate was used in place of sodium pyrrolidine-2-carboxylate; and the carbon dioxide absorption amount, amine compound recovery amount, and diffused amount were measured under the same conditions and using the same device as in Example 1.

The carbon dioxide absorption amount of the absorbing liquid at 40° C. was 0.32 mol per 1 mol of the amine compound in the absorbing liquid; the carbon dioxide absorption amount at 120° C. was 0.04 mol per 1 mol of the amine compound in the absorbing liquid, and the recovery amount was 0.28 mol. The absorption speed was $5.2 \times 10^{-3}$ mol/mol/min. In addition, the diffusion characteristic was about 4 ppm or less.

Example 3

The absorbing liquid was prepared in the same manner as in Example 1 except that 45 mass % of 1-[(2-hydroxyethyl)methylamino]-2-propanol, 3 mass % of sodium pyrrolidine-2-carboxylate, and 1 mass % of piperazine, and the carbon dioxide absorption amount and the amine compound recovery amount and diffusion amount were measured under the same conditions and using the same device as in Example 1.

The carbon dioxide absorption amount of the absorbing liquid at 40° C. was 0.37 mol per 1 mol of the amine compound in the absorbing liquid; the carbon dioxide absorption amount at 120° C. was 0.06 mol per 1 mol of the amine compound in the absorbing liquid, and the recovery amount was 0.31 mol. The absorption speed was $5.4 \times 10^{-3}$ mol/mol/min. In addition, the diffusion characteristic was about 6 ppm.

Example 4

The absorbing liquid was prepared in the same manner as in Example 1 except that 2-[(3-hydroxybutyl)methylamino]ethanol was used in place of 1-[(2-hydroxyethyl)methylamino]-2-propanol, and the carbon dioxide absorption amount and the amine compound recovery amount and diffusion amount were measured under the same conditions and using the same device as in Example 1.

The carbon dioxide absorption amount of the absorbing liquid at 40° C. was 0.33 mol per 1 mol of the amine compound in the absorbing liquid; the carbon dioxide absorption amount at 120° C. was 0.04 mol per 1 mol of the amine compound in the absorbing liquid, and the recovery amount was 0.29 mol. The absorption speed was $5.2 \times 10^{-3}$ mol/mol/min. In addition, the diffusion characteristic was about 5 ppm.

Example 5

The absorbing liquid was prepared in the same manner as in Example 1 except that methylaminodiisopropanol was used in place of 1-[(2-hydroxyethyl)methylamino]-2-propanol, and the carbon dioxide absorption amount and the amine compound recovery amount and diffusion amount were measured under the same conditions and using the same device as in Example 1.

The carbon dioxide absorption amount of the absorbing liquid at 40° C. was 0.33 mol per 1 mol of the amine compound in the absorbing liquid; the carbon dioxide absorption amount at 120° C. was 0.05 mol per 1 mol of the amine compound in the absorbing liquid, and the recovery amount was 0.28 mol. The absorption speed was $5.1 \times 10^{-3}$ mol/mol/min. In addition, the diffusion characteristic was about 5 ppm.

Example 6

The absorbing liquid was prepared in the same manner as in Example 1 except that 30 mass % of 1-[(2-hydroxyethyl)methylamino]-2-propanol and 20 mass % of piperazine ethanol, and the carbon dioxide absorption amount and the amine compound recovery amount and diffusion amount were measured under the same conditions and using the same device as in Example 1.

The carbon dioxide absorption amount of the absorbing liquid at 40° C. was 0.41 mol per 1 mol of the amine compound in the absorbing liquid; the carbon dioxide absorption amount at 120° C. was 0.05 mol per 1 mol of the amine compound in the absorbing liquid, and the recovery amount was 0.36 mol. The absorption speed was $9.9 \times 10^{-3}$ mol/mol/min. In addition, the diffusion characteristic was about 5 ppm.

Example 7

The absorbing liquid was prepared in the same manner as in Example 1 except that 20 mass % of 1-[(2-hydroxyethyl)methylamino]-2-propanol and 30 mass % of piperazine ethanol, and the carbon dioxide absorption amount and the amine compound recovery amount and diffusion amount were measured under the same conditions and using the same device as in Example 1.

The carbon dioxide absorption amount of the absorbing liquid at 40° C. was 0.51 mol per 1 mol of the amine compound in the absorbing liquid; the carbon dioxide absorption amount at 120° C. was 0.05 mol per 1 mol of the amine compound in the absorbing liquid, and the recovery amount was 0.46 mol. The absorption speed was $11.1 \times 10^{-3}$ mol/mol/min. In addition, the diffusion characteristic was about 6 ppm.

Example 8

The absorbing liquid was prepared in the same manner as in Example 1 except that 30 mass % of 1-[(3-hydroxypropyl)methylamino]-2-propanol and 20 mass % of piperazine ethanol, and the carbon dioxide absorption amount and the amine compound recovery amount and diffusion amount were measured under the same conditions and using the same device as in Example 1.

The carbon dioxide absorption amount of the absorbing liquid at 40° C. was 0.40 mol per 1 mol of the amine compound in the absorbing liquid; the carbon dioxide absorption amount at 120° C. was 0.05 mol per 1 mol of the amine compound in the absorbing liquid, and the recovery amount was 0.35 mol. The absorption speed was $9.0 \times 10^{-3}$ mol/mol/min. In addition, the diffusion characteristic was about 8 ppm.

Example 9

The absorbing liquid was prepared in the same manner as in Example 1 except that 30 mass % of 1-[(2-hydroxyethyl)methylamino]-2-propanol and 20 mass % of 4-(hydroxymethyl)piperidine, and the carbon dioxide absorption amount and the amine compound recovery amount and diffusion amount were measured under the same conditions and using the same device as in Example 1.

The carbon dioxide absorption amount of the absorbing liquid at 40° C. was 0.38 mol per 1 mol of the amine compound in the absorbing liquid; the carbon dioxide absorption amount at 120° C. was 0.05 mol per 1 mol of the amine compound in the absorbing liquid, and the recovery amount was 0.33 mol. The absorption speed was $8.5 \times 10^{-3}$ mol/mol/min. In addition, the diffusion characteristic was about 9 ppm.

Example 10

The absorbing liquid was prepared in the same manner as in Example 1 except that 30 mass % of 1-[(2-hydroxyethyl)

methylamino]-2-propanol, 15 mass % of piperazine ethanol, and 2 mass % of piperazine, and the carbon dioxide absorption amount and the amine compound recovery amount and diffusion amount were measured under the same conditions and using the same device as in Example 1.

The carbon dioxide absorption amount of the absorbing liquid at 40° C. was 0.40 mol per 1 mol of the amine compound in the absorbing liquid; the carbon dioxide absorption amount at 120° C. was 0.05 mol per 1 mol of the amine compound in the absorbing liquid, and the recovery amount was 0.34 mol. The absorption speed was $8.3 \times 10^{-3}$ mol/mol/min. In addition, the diffusion characteristic was about 7 ppm.

Example 11

The absorbing liquid was prepared in the same manner as in Example 1 except that 30 mass % of methylaminodiisopropanol and 20 mass % of piperazine ethanol, and the carbon dioxide absorption amount and the amine compound recovery amount and diffusion amount were measured under the same conditions and using the same device as in Example 1.

The carbon dioxide absorption amount of the absorbing liquid at 40° C. was 0.40 mol per 1 mol of the amine compound in the absorbing liquid; the carbon dioxide absorption amount at 120° C. was 0.05 mol per 1 mol of the amine compound in the absorbing liquid, and the recovery amount was 0.35 mol. The absorption speed was $9.2 \times 10^{-3}$ mol/mol/min. In addition, the diffusion characteristic was about 8 ppm.

Example 12

The absorbing liquid was prepared in the same manner as in Example 1 except that 30 mass % of 1-[(2-hydroxyethyl)methylamino]-2-propanol and 20 mass % of 4-hydroxypiperidine, and the carbon dioxide absorption amount and the amine compound recovery amount and diffusion amount were measured under the same conditions and using the same device as in Example 1.

The carbon dioxide absorption amount of the absorbing liquid at 40° C. was 0.43 mol per 1 mol of the amine compound in the absorbing liquid; the carbon dioxide absorption amount at 120° C. was 0.08 mol per 1 mol of the amine compound in the absorbing liquid, and the recovery amount was 0.35 mol. The absorption speed was $10.6 \times 10^{-3}$ mol/mol/min. In addition, the diffusion characteristic was about 9 ppm.

Comparative Example 1

In water, methyliminodiethanol and sodium pyrrolidine-2-carboxylate were dissolved so as to be 45 mass % and 5 mass % respectively to make a 50 ml aqueous solution (hereinafter referred to as an absorbing liquid). Then, the carbon dioxide absorption amount and the amine compound recovery amount and diffusion amount were measured under the same conditions and using the same device as in Example 1.

The carbon dioxide absorption amount of the absorbing liquid at 40° C. was 0.28 mol per 1 mol of the amine compound in the absorbing liquid; the carbon dioxide absorption amount at 120° C. was 0.06 mol per 1 mol of the amine compound in the absorbing liquid, and the recovery amount was 0.22 mol. The absorption speed was $4.9 \times 10^{-3}$ mol/mol/min. In addition, the diffusion characteristic was about 4 ppm.

Comparative Example 2

In water, methyliminodiethanol and piperazineethanol were dissolved so as to be 30 mass % and 20 mass % respectively to make a 50 ml aqueous solution (hereinafter referred to as an absorbing liquid). Then, the carbon dioxide absorption amount and the amine compound recovery amount and diffusion amount were measured under the same conditions and using the same device as in Example 1.

The carbon dioxide absorption amount of the absorbing liquid at 40° C. was 0.36 mol per 1 mol of the amine compound in the absorbing liquid; the carbon dioxide absorption amount at 120° C. was 0.05 mol per 1 mol of the amine compound in the absorbing liquid, and the recovery amount was 0.31 mol. The absorption speed was $8.0 \times 10^{-3}$ mol/mol/min. In addition, the diffusion characteristic was about 5 ppm.

<Results>

Table 1 shows the measurement results of the carbon dioxide absorption amount at 40° C. and absorption amount at 120° C. and the amine compound recovery amount in the diffusion characteristic test.

As obvious from Table 1, the absorbing liquids in Examples according to the embodiments of the present invention afford a larger carbon dioxide absorption amount and a larger recovery amount, compared to Comparative Examples. Furthermore, the absorption speed is higher. The diffusion characteristic is almost the same.

The acid gas absorbent, acid gas removal method, and acid gas removal device according to at least one of the above-mentioned embodiments can increase the absorbed amount of acid gas such as carbon dioxide.

TABLE 1

| Example | Absorption Amount (mol/mol) 40° C. | Absorption Amount (mol/mol) 120° C. | Recovery Amount (mol/mol) | Absorption Speed ($\times 10^{-3}$) mol/mol/min |
|---|---|---|---|---|
| 1 | 0.34 | 0.04 | 0.30 | 5.3 |
| 2 | 0.32 | 0.04 | 0.28 | 5.2 |
| 3 | 0.37 | 0.06 | 0.31 | 5.4 |
| 4 | 0.33 | 0.04 | 0.29 | 5.2 |
| 5 | 0.33 | 0.05 | 0.28 | 5.1 |
| 6 | 0.41 | 0.05 | 0.36 | 9.9 |
| 7 | 0.51 | 0.05 | 0.46 | 11.1 |
| 8 | 0.40 | 0.05 | 0.35 | 9.0 |
| 9 | 0.38 | 0.05 | 0.33 | 8.5 |
| 10 | 0.40 | 0.06 | 0.34 | 8.3 |
| 11 | 0.40 | 0.05 | 0.35 | 9.2 |
| 12 | 0.43 | 0.08 | 0.35 | 10.6 |

TABLE 2

| Comparative Example | Absorption Amount (mol/mol) 40° C. | Absorption Amount (mol/mol) 120° C. | Recovery Amount (mol/mol) | Absorption Speed ($\times 10^{-3}$) mol/mol/min |
|---|---|---|---|---|
| 1 | 0.28 | 0.06 | 0.22 | 4.9 |
| 2 | 0.36 | 0.05 | 0.31 | 8.0 |

REFERENCE SIGNS LIST

1: acid gas removal device
2: absorber

3: regenerator
4: gas supply inlet
5: acid gas absorbent supply inlet
6: gas exhaust outlet
7: heat exchanger
8: heater
9: pump
10: absorbing liquid cooler
11: reflux drum
12: reflux cooler
13: recovered acid gas carbon line
14: reflux water pump

The invention claimed is:

1. An acid gas absorbent comprising an amine compound and a cyclic amine compound represented by the following formula (3) or (3'):

wherein:
the amine compound is selected from the group consisting of
1-[(2-hydroxyethyl)methylamino]-2-propanol,
1-[(2-hydroxyethyl)ethylamino]-2-propanol,
1-[(2-hydroxyethyl)propylamino]-2-propanol,
1-[(2-hydroxyethyl)butylamino]-2-propanol,
1-[(3-hydroxypropyl)methylamino]-2-propanol,
1-[(3-hydroxypropyl)ethylamino]-2-propanol,
1-[(3-hydroxypropyl)propylamino]-2-propanol,
and 1-[(3-hydroxypropyl)butylamino]-2-propanol;
and wherein in the formula (3) and (3'):
$R^6$ and $R^7$ independently represent a hydrogen atom, a hydroxyl group, a $C_1$-$C_8$ hydroxy alkyl group, or an amino alkyl group, with the proviso that $R^6$ in the general formula (3) is a hydrogen atom;
at least one of two $R^6$ s in the formula (3') is a hydrogen atom, and, when $R^6$s are both hydrogen atoms, at least one of $R^7$s is a $C_1$-$C_8$ hydroxyalkyl group or aminoalkyl group;
p is an integer of 3 to 8;
q is an integer of 2 to 4; and
the heterocycle of the cyclic amine compound can contain not only a nitrogen atom and a carbon atom but also an oxygen atom in the heterocycle.

2. The acid gas absorbent according to claim 1, wherein the cyclic amine compound represented by the formula (3) or (3') is selected from the group consisting of
2-azetidilmethanol, 2-(2-aminoethyl)azetidine, 2-pyrrolidylmethanol, 2-(2-aminoethyl)pyrrolidine, 4-hydroxypiperidine, 2-piperidinemethanol, 3-piperidineethanol, 2-(2-aminoethyl)pyrrolidine, 1-(2-hydroxyethyl)piperazine, and 2-(hydroxymethyl)piperidine.

3. The acid gas absorbent according to claim 1, wherein the acid gas absorbent comprises the amine compound in an amount of 10 to 60 mass %, and comprises the cyclic amine compound represented by the formula (3) or (3') in an amount of 1 to 50 mass %, with respect to the whole amount of the acid gas absorbent as 100 mass %.

* * * * *